(12) United States Patent
Du et al.

(10) Patent No.: US 10,691,000 B2
(45) Date of Patent: Jun. 23, 2020

(54) AUTONOMOUS MOVING DEVICE

(71) Applicant: Positec Power Tools (Suzhou) Co., Ltd., Suzhou (CN)

(72) Inventors: Jiang Du, Suzhou (CN); Gen Sun, Suzhou (CN); Yue Rao, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 339 days.

(21) Appl. No.: 15/745,602

(22) PCT Filed: Jul. 15, 2016

(86) PCT No.: PCT/CN2016/090127
§ 371 (c)(1),
(2) Date: Jan. 17, 2018

(87) PCT Pub. No.: WO2017/012505
PCT Pub. Date: Jan. 26, 2017

(65) Prior Publication Data
US 2018/0210321 A1 Jul. 26, 2018

(30) Foreign Application Priority Data

Jul. 17, 2015 (CN) .......................... 2015 1 0424150
Jul. 30, 2015 (CN) ..................... 2015 2 0565150 U

(51) Int. Cl.
*G03B 17/55* (2006.01)
*G05B 19/042* (2006.01)
*G06K 9/54* (2006.01)
*H04N 5/225* (2006.01)
*B60R 11/04* (2006.01)
*H05B 3/84* (2006.01)

(52) U.S. Cl.
CPC .......... *G03B 17/55* (2013.01); *G05B 19/042* (2013.01); *G06K 9/54* (2013.01); *H04N 5/22521* (2018.08); *B60R 11/04* (2013.01); *G05D 2201/0201* (2013.01); *H05B 3/84* (2013.01)

(58) Field of Classification Search
CPC ...................................................... G03B 17/55
USPC .......................................................... 219/203
See application file for complete search history.

(56) References Cited

U.S. PATENT DOCUMENTS

| | | | |
|---|---|---|---|
| 2013/0212994 A1 | 8/2013 | Hwang et al. | |
| 2015/0057802 A1 | 2/2015 | Kroyan et al. | |
| 2015/0057805 A1 | 2/2015 | Kroyan et al. | |
| 2015/0198952 A1 | 7/2015 | Einecke et al. | |

(Continued)

FOREIGN PATENT DOCUMENTS

| | | |
|---|---|---|
| CN | 101972128 | 2/2011 |
| CN | 103336966 | 10/2013 |

(Continued)

OTHER PUBLICATIONS

English Translation of International Search Report and Written Opinion of PCT/CN2016/090127 dated Oct. 15, 2016.

*Primary Examiner* — Lauren A Crane
(74) *Attorney, Agent, or Firm* — Middleton Reutlinger

(57) ABSTRACT

The present invention relates to an autonomous moving device, including a camera and a camera heating device, where the camera heating device includes a heating module, and the heating module is configured to heat a lens of the camera to remove water mist on the lens. The present invention can effectively avoid a freezing or water mist phenomenon of a camera, thereby improving the photographing performance.

23 Claims, 4 Drawing Sheets

(56) References Cited

U.S. PATENT DOCUMENTS

2015/0366129 A1   12/2015  Borinato
2017/0020064 A1    1/2017  Doughty et al.
2017/0266574 A1    9/2017  Kroyan et al.

FOREIGN PATENT DOCUMENTS

| | | |
|---|---|---|
| CN | 104221575 | 12/2014 |
| CN | 204272265 | 4/2015 |
| CN | 204925588 | 12/2015 |
| CN | 106142104 | 11/2016 |
| CN | 205961841 | 2/2017 |
| CN | 206193532 | 5/2017 |
| DE | 102014204091 | 12/2014 |
| EP | 2816433 | 12/2014 |
| EP | 2894532 | 7/2015 |
| KR | 2013015457 | 2/2013 |
| KR | 2013061962 | 6/2013 |
| WO | 2014101840 | 7/2014 |
| WO | 2016161971 | 10/2016 |
| WO | 2017012505 | 1/2017 |
| WO | 2017019493 | 2/2017 |

AUTONOMOUS MOVING DEVICE

BACKGROUND

Technical Field

The present invention relates to an autonomous moving device, and in particular, to a camera heating device of an autonomous moving device.

Related Art

With the development of science and technology, intelligent autonomous moving devices are well known by people. An autonomous moving device can automatically perform a preset related task in advance according to a set program, without human operation and intervention. Therefore, the autonomous moving device is widely applied to the industry and household products. The intelligent autonomous moving devices that are applied to the industry, such as robots executing various functions, and that are applied to the household products, such as a mower or a vacuum cleaner greatly save time for people, and bring great convenience to industrial production and home life.

A camera device is usually mounted on the autonomous moving device, and an environment surrounding the autonomous moving device can be observed in real time by using the camera device, so as to avoid unexpected collisions or other accidents of the autonomous moving device. However, because the autonomous moving device usually works in an outdoor environment, the camera device is easily affected by the weather and the geographical environment. As a result, the camera device works abnormally. For example, if the camera device works in a rainy, snowy or wet, cold environment, water mist may be condensed on the camera device. As a result, a photographing function and the like are affected.

In addition, normal growth of vegetation has great influence on the environment. In a normal growing season of the vegetation, the growth condition of the vegetation needs to be determined in time to find whether the vegetation grows normally, so as to perform corresponding treatment on the vegetation, including watering, fertilizing, or adding microparticles.

Conventionally, a health state of the vegetation is identified mainly by using naked eyes, and such a method is obviously not accurate enough. When the vegetation grows normally, although there are some unhealthy growth phenomena, the overall change is not significant. Therefore, it is difficult to identify the health state by using naked eyes. If the health state cannot be determined and identified at an initial stage of the unhealthy growth of the vegetation, and treatment is performed when subsequent growth problems become severer as the vegetation grows, the healthy growth of the vegetation will be obviously hindered. Identifying the growth condition of the vegetation manually requires professional knowledge of a keeper about the vegetation, further making manual identification more difficult.

In addition, although it is identified that the health condition of some vegetation is not good, the vegetation currently still needs to be nurtured by a user manually, bringing in two disadvantages: First, the nurturing work is time-consuming and labor-consuming, and the user feels troublesome; and second, if the user is not a plant expert, the user usually does not know how to perform nurturing to improve the health state of the plant.

SUMMARY

In view of this, it is necessary to provide a camera heating device of an autonomous moving device, so as to resolve a problem that a photographing function is affected because water mist may be condensed on a camera device if the camera device works in a rainy, snowy or wet, cold environment.

An autonomous moving device comprises a camera and a camera heating device, the camera heating device comprises a heating module, and the heating module is configured to heat a lens of the camera to remove water mist on the lens.

In an embodiment, the camera heating device further comprises a transparent cover disposed outside the camera, and the heating module is mounted inside the transparent cover, and is located at a side portion of the camera and is adjacent to the camera.

In an embodiment, the transparent cover is a glass transparent cover or a plastic transparent cover.

In an embodiment, the heating module comprises a resistance wire, and the resistance wire is connected to a battery in the autonomous moving device.

In an embodiment, a heat-conducting insulator is disposed outside the resistance wire.

In an embodiment, a thermal pad is disposed on the lens of the camera, and the thermal pad is connected to the resistance wire.

In an embodiment, the resistance wire is a continuously bent resistance wire.

In an embodiment, the continuously bent resistance wire is a resistance wire bent transversely and vertically.

In an embodiment, there is at least one resistance wire.

In an embodiment, a temperature sensor is further disposed in a transparent cover, where the temperature sensor is connected to a controller in the autonomous moving device.

In an embodiment, the heating module is located on or inside the camera.

In an embodiment, the autonomous moving device further comprises a wiper, wherein the wiper controllably erases the water mist on the lens.

In an embodiment, the autonomous moving device further comprises a controller, and the controller controls the heating module to heat or stop heating.

In an embodiment, the autonomous moving device further comprises a sensor that detects information about an environment nearby the camera, the sensor sends the detected environment information to the controller, and the controller controls, according to whether the environment information meets a preset condition, the heating module to heat or stop heating.

In an embodiment, the sensor is at least one of a temperature sensor, a humidity sensor, and a rain sensor.

In an embodiment, the autonomous moving device further comprises a communication module, the communication module receives climate information and sends the climate information to the controller, and the controller controls, according to whether the climate information meets a preset condition, the heating module to heat or stop heating.

In an embodiment, the autonomous moving device further comprises a clock module, wherein the clock module records time information and sends the time information to the controller, and the controller controls, according to whether the time information meets a preset condition, the heating module to heat or stop heating.

In an embodiment, the autonomous moving device further comprises a system for identifying a vegetation health state, wherein the system for identifying a vegetation health state comprises:

an obtaining module, configured to obtain image information of vegetation;

an extraction module, configured to extract color values corresponding to the vegetation from the image information, the color value being RGB values of the vegetation; and an identification module, configured to compare the RGB values of the vegetation with color values when the vegetation grows healthily to identify whether the vegetation is healthy.

In an embodiment, the obtaining module is a near-infrared camera.

In an embodiment, the autonomous moving device further comprises a vegetation health reminder module, wherein the vegetation health reminder module sends information about whether the vegetation is healthy and/or vegetation nurturing advice information to a user.

In an embodiment, the vegetation health reminder module comprises a communication module, the communication module communicates with a personal intelligent device of the user, to send the information about whether the vegetation is healthy and/or the vegetation nurturing advice information to the personal intelligent device of the user.

In an embodiment, the information about whether the vegetation is healthy comprises a region in which the vegetation is located and a vegetation health level and/or vegetation disease type of the region; and the vegetation nurturing advice information comprises advising at least one of the advises on fertilizing, watering, scarification, weeding, and pesticide spraying.

In an embodiment, the autonomous moving device further comprises a vegetation nurturing module, wherein the vegetation nurturing module performs a vegetation nurturing action on a region in which the vegetation is unhealthy.

In an embodiment, the vegetation nurturing module comprises at least one of a fertilization module, a watering module, a scarification module, a weeding module, and a pesticide spraying module.

The foregoing camera heating device of the autonomous moving device can effectively avoid impacts of pollutants such as dust on the camera, thereby improving the photographing performance. A resistance wire is disposed. Therefore, in a rainy, snowy environment or wet, cold environment, the temperature of the camera can be improved by heating with the resistance wire, so as to avoid a freezing or water mist phenomenon of the camera, thereby improving the photographing performance.

In view of this, it is necessary to provide an autonomous moving device for automatic gardening and a method for identifying a vegetation health state thereof, to identify in time whether the vegetation grows healthily.

A method for identifying a vegetation health state of an autonomous moving device includes:

obtaining image information of vegetation;

extracting color values corresponding to the vegetation from the image information, the color value being RGB values of the vegetation; and comparing the RGB values of the vegetation with color values when the vegetation grows healthily to identify whether the vegetation is healthy.

In an embodiment, the image information of the vegetation is obtained by using a near-infrared camera.

In an embodiment, the color value corresponding to the vegetation is extracted from the image information by using the Weber local feature algorithm.

In an embodiment, the identification method further includes:

filtering the RGB values of the vegetation, so as to filter and eliminate RGB values that are not of the color of the vegetation.

In an embodiment, the RGB values of the vegetation are filtered by determining whether the RGB values of the vegetation are within preset intervals.

In an embodiment, the preset intervals include RGB values of vegetation in both healthy and unhealthy states.

In an embodiment, the color value when the vegetation grows healthily is in intervals of corresponding R, G, and B values; and when the RGB values of the vegetation are compared with the color value when the vegetation grows healthily, R, G, and B values in the RGB values of the vegetation are compared respectively to determine whether they are in the intervals of the corresponding R, G, and B values.

In an embodiment, the identification method further includes the following steps: sending information about whether the vegetation is healthy to a user; and/or sending vegetation nurturing advice information to the user.

In an embodiment, the information about whether the vegetation is healthy includes a region in which the vegetation is located and a vegetation health level and/or vegetation disease type of the region; and the vegetation nurturing advice information includes at least one of the advises on fertilizing, watering, scarification, weeding, and pesticide spraying.

In an embodiment, the identification method further includes the following step:

performing a vegetation nurturing action on a region in which the vegetation is unhealthy.

In an embodiment, the vegetation nurturing action includes at least one of fertilizing, watering, scarification, weeding, and pesticide spraying.

An autonomous moving device is provided, including a system for identifying a vegetation health state, where the system for identifying a vegetation health state includes: an obtaining module, configured to obtain image information of vegetation;

an extraction module, configured to extract color values corresponding to the vegetation from the image information, the color value being RGB values of the vegetation; and an identification module, configured to compare the RGB values of the vegetation with color values when the vegetation grows healthily to identify whether the vegetation is healthy.

In an embodiment, the obtaining module is a near-infrared camera.

In an embodiment, the extraction module extracts the color value corresponding to the vegetation from the image information by using the Weber local feature algorithm.

In an embodiment, the identification system further includes:

a filtering module, configured to filter the RGB values of the vegetation, so as to filter and eliminate RGB values that are not of the color of the vegetation.

In an embodiment, the filtering module filters the RGB values of the vegetation by determining whether the RGB values of the vegetation are within preset intervals.

In an embodiment, the preset intervals include RGB values of vegetation in both healthy and unhealthy states.

In an embodiment, the color value when the vegetation grows healthily is in intervals of corresponding R, G, and B values; and when the identification module compares the RGB values of the vegetation with the color value when the vegetation grows healthily, whether R, G, and B values in the RGB values of the vegetation are compared respectively to determine whether they are in the intervals of the corresponding R, G, and B values.

In an embodiment, a vegetation health reminder module is further included, where the vegetation health reminder module sends information about whether the vegetation is healthy and/or vegetation nurturing advice information to a user.

In an embodiment, the vegetation health reminder module includes a communication module, where the communication module communicates with a personal intelligent device of the user, to send the information about whether the vegetation is healthy and/or the vegetation nurturing advice information to the personal intelligent device of the user.

In an embodiment, the information about whether the vegetation is healthy includes a region in which the vegetation is located and a vegetation health level and/or vegetation disease type of the region; and the vegetation nurturing advice information includes at least one of the advises on fertilizing, watering, scarification, weeding, and pesticide spraying.

In an embodiment, a vegetation nurturing module is further included, where the vegetation nurturing module performs a vegetation nurturing action on a region in which the vegetation is unhealthy.

In an embodiment, the vegetation nurturing action includes at least one of a fertilization module, a watering module, a scarification module, a weeding module, and a pesticide spraying module.

In the foregoing system and method for identifying a vegetation health state, the RGB values of the vegetation are extracted from the image information, so that the growth condition of the vegetation is determined, thereby improving the efficiency and the accuracy of the determining; and whether the vegetation grows healthily is identified in time, so as to be able to take corresponding treatment when the vegetation is unhealthy.

DETAILED DESCRIPTION

To make the objectives, technical solutions, and advantages of the present invention clearer, the present invention is further described in detail with reference to the accompanying drawings and the embodiments. It should be understood that the specific embodiments described herein are merely intended to explain the present invention, but are not intended to limit the present invention.

Figure 1:
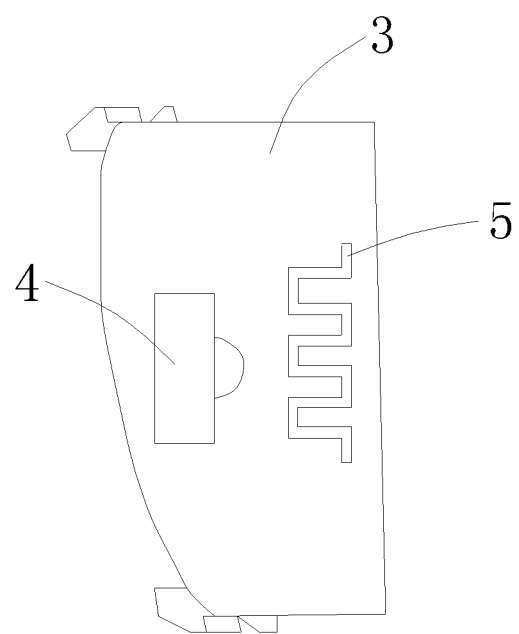
FIG. 1 is a structural diagram of a camera heating device of an autonomous moving device according to an embodiment.
Figure 2:
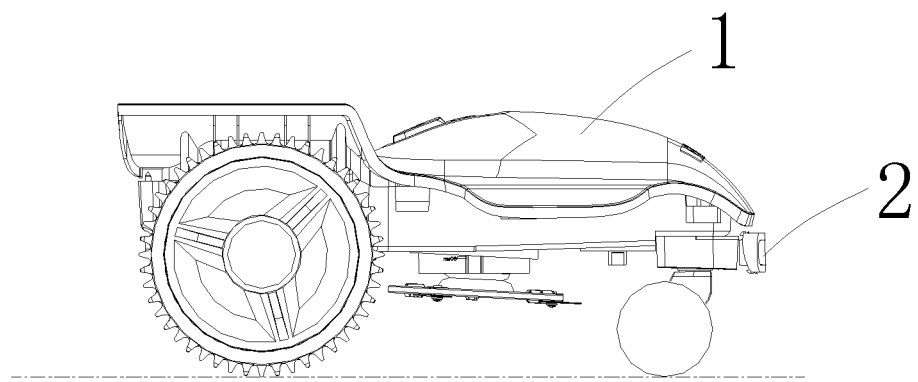
FIG. 2 is a structural diagram of an autonomous moving device mounted with a camera heating device.

As shown in FIG. 1 and FIG. 2, a camera heating device 2 of an autonomous moving device in an embodiment includes a transparent cover 3 disposed outside a camera 4. A heating module 5 is mounted inside the transparent cover 3. The heating module 5 is adjacent to the camera 4 and is located at a side portion of the camera 4.

Generally, there are two objectives to mount the camera 4 on the autonomous moving device 1: One is to obtain image information of a surrounding environment, so as to analyze the image information; and the other one is that the autonomous moving device 1 needs to complete a work task by using the camera 4. Therefore, the autonomous moving device 1 may be mounted with cameras 4 of different pixel levels according to different situations. For example, a camera may be mounted with an ordinary camera, or may be mounted with a high definition camera. While being mounted, to collect the image information, the camera 4 may be mounted at a position in a front portion of the autonomous moving device 1, as shown in FIG. 2.

The transparent cover 3 needs a good transparency, which cannot affect the imaging effect of the camera. And the transparent cover 3 needs to be further considered that it should not expand with heat and contract with cold when a resistance wire is heated. Otherwise, the size of the transparent cover 3 is easily unstable. As a result, an image obtained by the camera 4 is blurry. In material selections, the transparent cover 3 is preferentially a glass transparent cover. The glass transparent cover is fully transparent, and therefore can ensure the imaging effect. However, when the requirements on the imaging effect are not high, the transparent cover 3 may be a plastic transparent cover, so as to fully reduce the costs.

The heating module 5 includes a resistance wire. To provide a power supply conveniently, the resistance wire may be supplied with power separately, or may be connected to a battery in the autonomous moving device 1 to obtain the power supply. If the resistance wire is supplied with power separately, a separate power supply battery needs to be provided. The power supply battery may be disposed inside the transparent cover 3, or may be disposed in the autonomous moving device 1. When disposed in the autonomous moving device 1, the power supply battery may be connected to the resistance wire by using a connection line.

To evenly heat an inner portion of the transparent cover 3 when the resistance wire is heated, and to quickly remove water mist on the lens of the camera 4, as shown in FIG. 1, the resistance wire may be designed to be a continuously bent resistance wire. The bent resistance wire may be bent on an oblique line or be bent in other manners. However, a resistance wire linearly bent transversely and vertically easily equalizes generated heat, and has a larger area in which the heat is generated. The specific shape is shown in FIG. 1. According to the size of an inner space of the transparent cover 3, there may be one or more resistance wires connected in parallel.

To avoid undesirable situations during heating of the resistance wire, a heat-conducting insulator needs to be disposed outside the resistance wire. Disposing an insulator can avoid a situation where moisture inside the transparent cover 3 is condensed on the resistance wire to make it short-circuit.

To heat the lens of the camera 4 to remove the water mist more quickly, a thermal pad may be disposed on the lens, and the thermal pad is connected to the resistance wire. Disposing of the thermal pad cannot affect the photographing performance of the lens. The thermal pad is not suitable to be a metal that may rust; otherwise, the thermal pad may be easy to rust, with rust chips adhered to the transparent cover, and the photographing performance of the camera may be affected. Therefore, in material selections, a material having good heat-conducting property but being not easy to rust needs to be selected for the thermal pad.

A temperature sensor may further be disposed inside the transparent cover 3. The temperature sensor is connected to a controller in the autonomous moving device 1. The temperature sensor may transmit the temperature that is obtained in real time to the controller. The controller may automatically detect the temperature in the transparent cover 3. If the temperature is excessively low, a water mist phenomenon may occur, and then the controller may automatically control the battery in the autonomous moving device 1 to supply power to the resistance wire, so that the resistance wire heats to raise the temperature in the transparent cover 3, thereby removing the water mist that may be generated on the lens of the camera 4. When the temperature obtained by the temperature sensor is excessively high, and the controller detects that the temperature is excessively high, the battery may be controlled to stop supplying power to the resistance wire, so that the resistance wire stops heating. The water mist phenomenon that may occur on the camera 4 is automatically removed by automatically controlling the temperature in the transparent cover 3 by using the temperature sensor. Heating of the resistance wire may be manually and initiatively controlled. The foregoing is merely an embodiment of the present invention, and the present invention is not limited to other similar or same implementations.

In another embodiment, the heating module is a hot air device, and includes the resistance wire and a blowing mechanism. The hot air device has at least one blowing port that faces the lens.

In another embodiment, the heating module of the camera heating device is directly disposed on the camera or inside the camera, so as to be closer to the lens, thereby reducing the heat loss. For example, when the heating module is the resistance wire, the resistance wire is assembled in a mounting base of the lens in an embedded manner, or is directly mounted in the lens in an embedded manner. In this embodiment, if the camera heating device includes the transparent cover, the resistance wire is further disposed nearby the lens cover or in the lens cover.

In another embodiment, the autonomous moving device further includes a wiper. The wiper can controllably erase the water mist on the lens. The wiper is driven by a separate small motor to move back and forth, so as to wipe the lens. The shape of the wiper may be rod-like or sheet-like, and the number may be one or two; details are not described herein again. The wiper cooperates with the heating module, so as to quicken the speed of removing the water mist and water stain, being particularly practical in severe working conditions such as a heavily rainy working condition. In this embodiment, if the camera heating device includes the transparent cover, the wiper is further disposed on the lens cover, so as to erase water on the lens cover.

In the foregoing embodiments, that the temperature sensor and the controller control a heating device to start heating or stop heating is described. In another embodiment, the sensor may be of other types, for example, a humidity sensor, a rain sensor, or a combination of at least two of the temperature sensor, the humidity sensor, and the rain sensor. The sensor is located nearby the camera, and detects information about an environment nearby the camera and sends the environment information to the controller. The controller controls, according to whether the environment information meets a preset condition, the heating module to heat or stop heating. The preset condition indicates whether there is water mist on the lens. For example, when the sensor is a humidity sensor, the controller controls, when the environmental humidity is greater than a preset value, the heating module to heat; and controls, when the environmental humidity is less than the preset value, the heating module to stop heating. Alternatively, the controller controls, when the environmental humidity is greater than the preset value, the heating module to stop heating after heating for a preset time length. When the sensor is a rain sensor, the controller controls, when the sensor detects that it is rainy, the heating module to heat; and after the rain stops, the controller controls the heating module to stop heating. If the autonomous moving device includes multiple types of sensors, environment information detected by any sensor indicates that when water mist possibly exists on the lens, the controller controls the heating module to heat; and when environment information detected by all sensors all indicates that there is no water mist on the lens, the controller controls the heating module to stop heating. Alternatively, if the autonomous moving device includes multiple types of sensors, the preset condition of the controller integrates information sent back by different sensors, so as to determine whether there is water mist on the lens. The controller may allocate different weights for the information detected by different sensors.

In another embodiment, the autonomous moving device further includes a communication module. The communication module receives climate information and sends the climate information to the controller. The controller controls, according to whether the climate information meets a preset condition, the heating module to heat or stop heating. The communication module is connected to the Internet or other information sources to obtain the climate information. The climate information may be one or more of real-time weather information, future weather forecast, or historical weather statistics of the current area. When the climate information indicates that it is rainy, or the humidity is high, the fog is heavy, or it is easily frosty, the controller determines that the lens or the transparent cover may have water, and the heating module is started to heat. The communication module may be a WIFI module, a cellular communication module, a Zigbee module, a Bluetooth module, an RF module, or other modules well known in the industry, and details are not described herein again.

In another embodiment, the autonomous moving device further includes a clock module. The clock module records time information and sends the time information to the controller. The controller controls, according to whether the time information meets a preset condition, the heating module to heat or stop heating. For example, the controller starts the heating module to heat in the morning when the fog is heavy, for example, at six to eight o'clock in the morning.

As shown in FIG. 2, the autonomous moving device 1 may be a mower. The camera 4 is mounted on the mower, so as to be able to obtain a growth situation of grass in a lawn in real time, and automatically performs grass cutting when the grass is relatively tall; or may observe and record places where the grass cutting is performed while performing the grass cutting, so as to perform the grass cutting for places where the grass cutting is not performed. The mower usually performs the grass cutting outdoors. Therefore, if the camera 4 is separately mounted, the camera 4 may easily have a water mist phenomenon when the weather or a working environment changes, resulting in relatively poor photographing performance. Therefore, as shown in FIG. 2, a camera heating device 2 may be mounted at a position in a front portion of the mower, so as to improve the photographing performance in this embodiment by using the heating device 2.

The autonomous moving device 1 may be a mower, or may be another device. This embodiment only describes the mower as a specific object, and is not limited to protecting the mower which is a type of autonomous moving device. All devices having autonomous moving functions shall fall within the protection scope of the present invention.

In the foregoing camera heating device of the autonomous moving device, the camera is disposed in the transparent cover, so as to be able to effectively avoid impacts of pollutants such as dust on the camera, thereby improving the photographing performance. The resistance wire is disposed in the transparent cover. Therefore, in a rainy, snowy or wet, code environment, the temperature of the camera can be raised by heating with the resistance wire, so as to avoid a freezing or water mist phenomenon of the camera, thereby improving the photographing performance.

Figure 3:
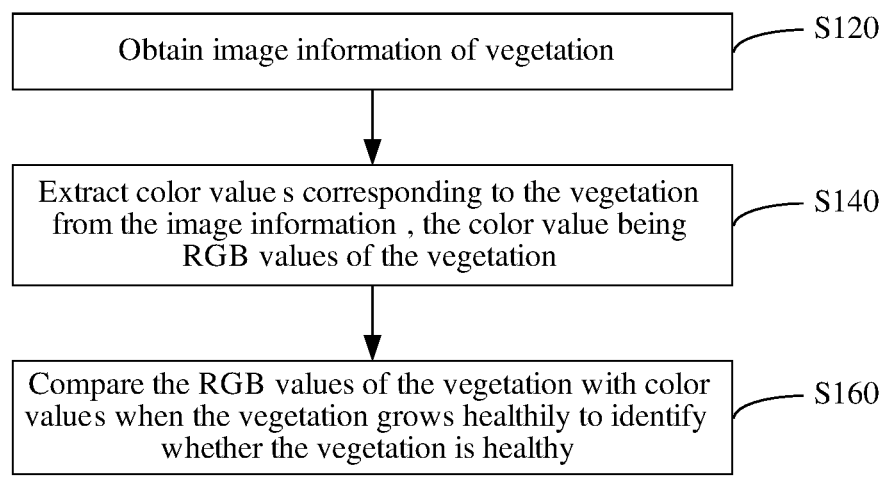
FIG. 3 is a flowchart of a method for identifying a vegetation health state according to an embodiment.

As shown in FIG. 3, a method for identifying a vegetation health state of an autonomous moving device according to an embodiment includes step S120 to step S160. This embodiment may be combined with the foregoing embodiments to form an entire solution.

Figure 4:
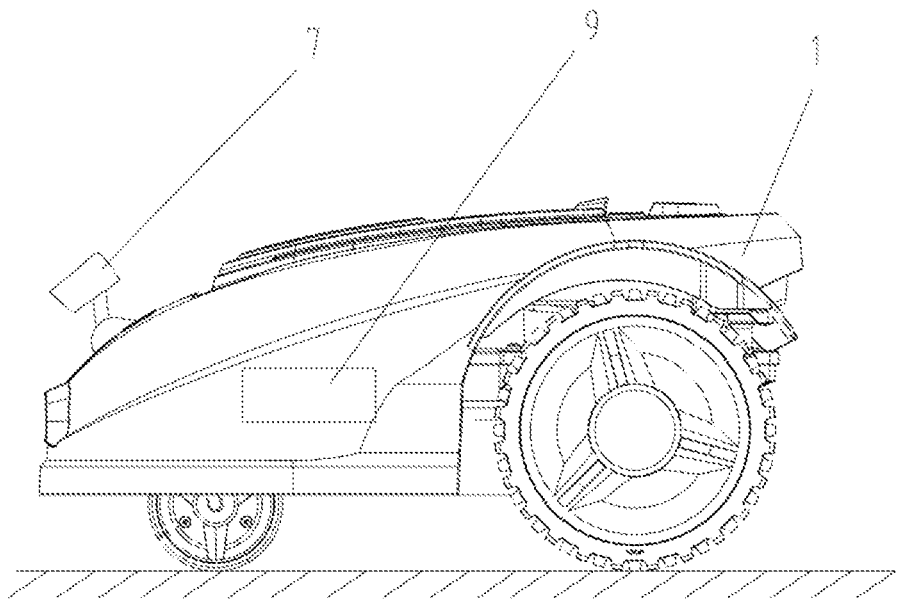
FIG. 4 is a schematic diagram that a near-infrared camera is mounted on a mower.

Step S120. Obtain image information of vegetation. Whether the vegetation is healthy may be determined according to whether the color of the vegetation is normal when the vegetation grows. The color consists of three color channels: R, G, and B. Therefore, the health state of the vegetation may be identified by analyzing R, G, and B color values of the vegetation. The color of the vegetation may be captured by a near-infrared camera. Generally, it is time-consuming and labor-consuming to manually collect the image information of the vegetation. The near-infrared camera may be mounted on the autonomous moving device. For example, if a user wants to observe a growth condition of a lawn, the near-infrared camera may be mounted on a mower, as shown in FIG. 4, on an autonomous moving device 1. Herein, specifically, a near-infrared camera 7 is mounted in the front of the mower, and the near-infrared camera 7 may be connected to a controller 9 mounted in a housing of the mower. The near-infrared camera and the camera in the foregoing embodiments may be the same one, or may be respectively independently disposed. When the near-infrared camera 7 is independently disposed, a separate camera heating device may be disposed for the near-infrared camera 7, and a specific structure is as stated in the foregoing embodiments. When the mower moves, the near-infrared camera 7 may be controlled to work to obtain the image information of the vegetation in the entire lawn in time, so as to determine in time whether the vegetation in the lawn is healthy. Sensitive to electromagnetic waves having wavelengths in a range from 780 nm to 3000 nm, the near-infrared camera 7 may effectively obtain the image information of the vegetation, and is a digital image imaging device dedicated to the vegetation. The near-infrared camera 7 has stable performance and is easy to be mounted, and may be conveniently mounted on the mower. The camera is compact and sturdy in structure, is not easily damaged, has a long continuous working time, may be used in a relatively bad environment, and may continuously perform imaging work for 24 hours. This is a task that cannot be implemented manually. The near-infrared camera scans line by line to image, and outputs bare data. The near-infrared camera has a relatively wide spectral range and very high imaging quality, being suitable for imaging the vegetation. The foregoing mower is only one type of autonomous moving device. Other devices can also use the same or a similar practice. For example, an infrared camera may be mounted on a vehicle that observes a growth condition of the vegetation.

Step S140. Extract color values corresponding to the vegetation from the image information, the color value being RGB values of the vegetation. The RGB values of an image may be extracted from the image information obtained from the near-infrared camera. There are multiple extraction algorithms that may be algorithms such as scale invariant feature transform (SIFT), speeded up robust feature (SURF), DAISY (DAISY is a local image feature descriptor that may be quickly calculated for dense feature extraction), Haar (a rectangular feature), WLD (Weber local feature), local binary patterns (LBP), ORB (a binary feature descriptor), BRIEF (a feature descriptor), LDA-hash (a feature descriptor), maximally stable external regions (MSER, region feature extraction), histogram of oriented gradient (HOG), a grayscale value, a color histogram, a grayscale histogram, and a grayscale moment. Herein, the color value corresponding to the vegetation may be extracted from the image information by using the WLD (Weber local feature) algorithm. The WLD algorithm may effectively obtain local information in the image. The obtained local information is more accurate, so that whether a specific part (for example, a branch or a leaf) of the vegetation grows normally is determined more effectively.

Step S160. Compare the RGB values of the vegetation with color values when the vegetation grows healthily to identify whether the vegetation is healthy. The color value when the vegetation grows healthily is corresponding R, G, and B values. Data of the color value when the vegetation grows healthily may be pre-stored. Generally, the color value when the vegetation grows healthily is not necessarily fixed. Changes in conditions such as different water content may result in corresponding changes in the color value. Therefore, the R, G, and B values corresponding to the pre-stored color value when the vegetation grows healthily may be in appropriate intervals. When the RGB values of the vegetation are compared with the color value when the vegetation grows healthily, whether the R, G, and B values in the RGB values of the vegetation are in the intervals of the corresponding R, G, and B values is determined by means of respective comparison. If the R, G, and B values are in the corresponding intervals, it indicates that the vegetation grows healthily; otherwise, it indicates that there may be some problems in the growth. Problems existing in the growth of the vegetation may be analyzed to find specific reasons, so that comprehensive treatment is performed, and the vegetation returns to normal and grows healthily. As shown in FIG. 4, a memory may be disposed at the controller 9 in the mower, so as to store the color value when the vegetation grows healthily. An algorithm processing program is set in the controller 9, to extract the color value in the image information according to step S140 and to further perform step S160 through program control, so as to automatically identify whether the vegetation is healthy. Disposing a processor in the autonomous moving device is only one of the implementable manners, or the image information may be processed by disposing a processor separately, including performing step S140 and step S160. The memory may be disposed in the separate processor, to store the color value when the vegetation grows healthily.

In the foregoing method for identifying a vegetation health state, the RGB values of the vegetation are extracted from the image information, so that the growth condition of the vegetation is determined, thereby improving the efficiency and the accuracy of the determining; and whether the vegetation grows healthily is identified in time, so as to be able to take corresponding treatment when the vegetation is unhealthy.

Figure 5:
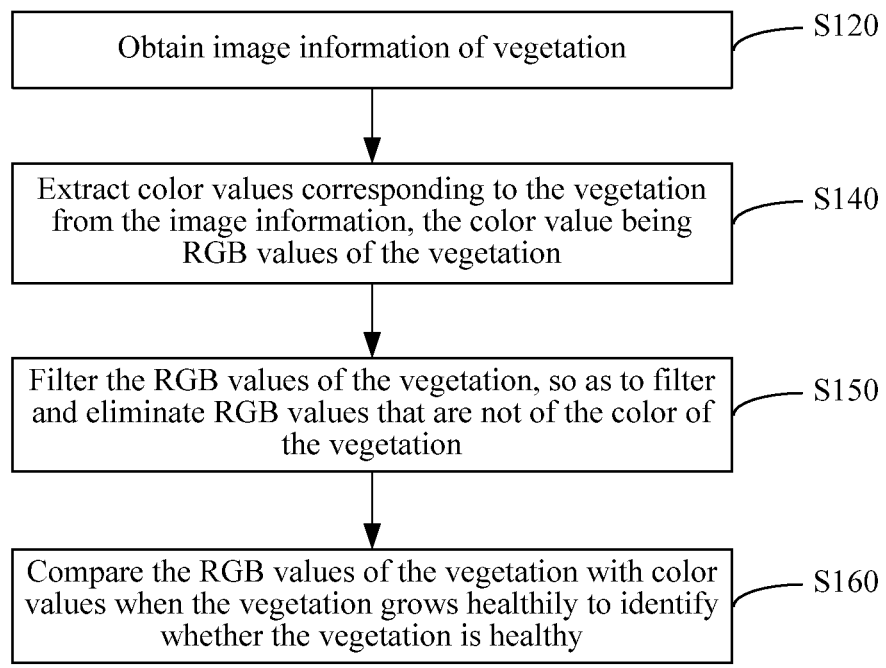
FIG. 5 is a flowchart of a method for identifying a vegetation health state of an autonomous moving device according to another embodiment.

As shown in FIG. 5, a method for identifying a vegetation health state of an autonomous moving device according to another embodiment further includes step S150. This embodiment may be combined with the foregoing embodiments to form an entire solution.

Step S150. Filter the RGB values of the vegetation, so as to filter and eliminate RGB values that are not of the color of the vegetation from the RGB values of the vegetation. When the near-infrared camera obtains the image information of the vegetation, the obtained image information is various and may include an image of the sky, an obstacle, other images, and like. Therefore, the RGB values extracted from the image information are also different. However, directly determining and identifying the RGB values that do not belong to the vegetation in step S160 require a relatively long operation time and have relatively high requirements on the processing performance of the controller. Therefore, the RGB values of the vegetation may be filtered to eliminate RGB values that are not of a plant. The RGB values of the vegetation may be compared with preset intervals, to determine whether the RGB values of the vegetation are in the preset intervals. If not, it indicates that the RGB values that are not of a plant may be directly eliminated. The preset intervals need to include RGB values when the vegetation is in a healthy state and an unhealthy state, so as to ensure that data is not mistakenly deleted, thereby keeping integrity of the data.

A method for identifying a vegetation health state of an autonomous moving device according to another embodiment further includes step S170 and step S180. This embodiment may be combined with the foregoing embodiments to form an entire solution.

Step S170. Send information about whether the vegetation is healthy to a user. Specifically, the information about whether the vegetation is healthy includes a region in which the vegetation is located and a vegetation health level and/or vegetation disease type of the region.

In an implementation solution of this embodiment, the information is sent, in the form of graphics, to a personal smart device hold by the user, such as a smartphone, a smart tablet computer, a smart watch, or a personal computer. The graphical information may be in the form of a garden or a lawn of the user, and a vegetation health level and/or vegetation disease type of each region is indicated thereon in the forms of colors, text, and icons. For example, green, yellow, and red are respectively used to indicate that the health state of the vegetation is good, intermediate, and bad; text or icons are used to indicate that the vegetation in the corresponding region lacks water, lacks fertilizers, needs to be scarified, has pests and diseases, and the like; and values are used to indicate values of various health indicators of the plant. Certainly, other presentation forms are also feasible.

In another implementation solution of this embodiment, the information may be sent, in the form of a health report of the garden, to a smart device of the user in proper manners such as an email or a short message. The health report of the garden shows the health condition of the garden according to categories and regions, for example, an overall health state of the vegetation in each region, a pest and disease condition, water content, nutrient content, or microelement content.

In another implementation solution of this embodiment, the information about whether the vegetation is healthy is presented on a host of the autonomous moving device, for example, a display screen of the autonomous moving device, or is played in a voice form. Specific content and the presentation form of the information are similar to those in the foregoing implementation solutions, and details are not described herein again.

Step S180. Send vegetation nurturing advice information to the user. Specifically, the vegetation nurturing advice information includes advising at least one of fertilizing, watering, scarification, weeding, and pesticide spraying. Similar to step S170, the vegetation nurturing advice information may also be sent to a personal device of the user in the form of graphics or a report, for example, reminding, in the form of a combination of one or more of a map, a color, text, and an icon, the user that actions such as watering and fertilizing need to be performed on a particular region, and details are not described herein again.

In an optional embodiment, there is only one of step S170 and step S180.

A method for identifying a vegetation health state of an autonomous moving device according to another embodiment further includes step S190.

Step S190. Perform a vegetation nurturing action on a region in which the vegetation is unhealthy. Specifically, the vegetation nurturing action includes at least one of fertilizing, watering, scarification, weeding, and pesticide spraying.

The autonomous moving device correspondingly performs one or more nurturing actions according to specific detected health problems of the vegetation. For example, the autonomous moving device performs an action of watering when it is detected that the vegetation lacks water; the autonomous moving device performs an action of fertilizing, scarification, or weeding when it is detected that the vegetation lacks nutrients; and the autonomous moving device performs an action of pesticide spraying when it is detected that the vegetation has pests and diseases.

Figure 6:
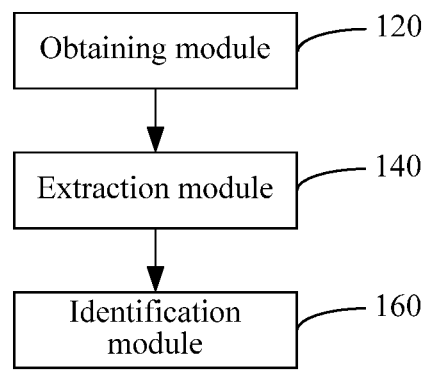
FIG. 6 is a structural diagram of a system for identifying a vegetation health state of an autonomous moving device according to an embodiment.

As shown in FIG. 6, a system for identifying a vegetation health state according to an embodiment includes an obtaining module 120, an extraction module 140, and an identification module 160. This embodiment may be combined with the foregoing embodiments to form an entire solution.

The obtaining module 120 is configured to obtain image information of vegetation. Whether the vegetation is healthy may be determined according to whether the color of the vegetation is normal when the vegetation grows. The color consists of three color channels: R, G, and B. Therefore, the health state of the vegetation may be identified by analyzing R, G, and B color values of the vegetation. The color of the vegetation may be captured by a near-infrared camera. Generally, it is time-consuming and labor-consuming to manually collect the image information of the vegetation. The near-infrared camera may be mounted on the autonomous moving device. For example, if a user wants to observe a growth condition of a lawn, the near-infrared camera may be mounted on an autonomous moving device 1 that is specifically a mower. As shown in FIG. 4, a near-infrared camera 7 may be mounted in the front of the mower, and the near-infrared camera 7 may be connected to a controller 9 mounted in a housing of the mower. When the mower moves, the near-infrared camera 7 may be controlled to work to obtain the image information of the vegetation in the entire lawn in time, so as to determine in time whether the vegetation in the lawn is healthy. Sensitive to electromagnetic waves having wavelengths in a range from 780 nm to 3000 nm, the near-infrared camera 7 may effectively obtain the image information of the vegetation, and is a digital image imaging device dedicated to the vegetation. The near-infrared camera 7 has stable performance and is easy to be mounted, and may be conveniently mounted on the mower. The camera is compact and sturdy in structure, is not easily damaged, has a long continuous working time, may be used in a relatively bad environment, and may continuously perform imaging work for 24 hours. This is a task that cannot be achieved manually. The near-infrared camera scans line by line to image, and outputs bare data. The near-infrared camera has a relatively wide spectral range and very high imaging quality, being suitable for imaging the vegetation. The foregoing mower is only one type of autonomous moving device. Other devices can also use the same or a similar practice. For example, an infrared camera may be mounted on a vehicle that observes a growth condition of the vegetation.

The extraction module 140 is configured to extract color values corresponding to the vegetation from the image information, the color value being RGB values of the vegetation. The RGB values of an image may be extracted from the image information obtained from the near-infrared camera. There are multiple extraction algorithms that may be algorithms such as SIFT, SURF, DAISY (DAISY is a local image feature descriptor that may be quickly calculated for dense feature extraction), Haar (a rectangular feature), WLD (Weber local feature), LBP, ORB (a binary feature descriptor), BRIEF (a feature descriptor), LDA-hash (a feature descriptor), MSER (region feature extraction), HOG, a grayscale value, a color histogram, a grayscale histogram, and a grayscale moment. Herein, the color value corresponding to the vegetation may be extracted from the image information by using the WLD (Weber local feature) algorithm. The WLD algorithm may effectively obtain local information in the image. The obtained local information is more accurate, so that whether a specific part (for example, a branch or a leaf) of the vegetation grows normally is determined more effectively.

The identification module 160 is configured to compare the RGB values of the vegetation with color values when the vegetation grows healthily to identify whether the vegetation is healthy. The color value when the vegetation grows healthily is corresponding R, G, and B values. Data of the color value when the vegetation grows healthily may be pre-stored. Generally, the color value when the vegetation grows healthily is not necessarily fixed. Changes in conditions such as different water content may result in corresponding changes in the color value. Therefore, the R, G, and B values corresponding to the pre-stored color value when the vegetation grows healthily may be in appropriate intervals. When the RGB values of the vegetation are compared with the color value when the vegetation grows healthily, whether the R, G, and B values in the RGB values of the vegetation are in the intervals of the corresponding R, G, and B values is determined by means of respective comparison. If the R, G, and B values are in the corresponding intervals, it indicates that the vegetation grows healthily; otherwise, it indicates that there may be some problems in the growth. Problems existing in the growth of the vegetation may be analyzed to find specific reasons, so that comprehensive treatment is performed, and the vegetation returns to normal and grows healthily. As shown in FIG. 4, a memory may be disposed at the controller 9 in the mower, so as to store the color value when the vegetation grows healthily. An algorithm processing program is set in the controller 9, to extract the color value in the image information according to step S140 and to further perform step S160 through program control, so as to automatically identify whether the vegetation is healthy. Disposing a processor in the autonomous moving device is only one of the implementable manners, or the image information may be processed by disposing a processor separately, including performing step S140 and step S160. The memory may be disposed in the separate processor, to store the color value when the vegetation grows healthily.

In the foregoing system for identifying a vegetation health state, the RGB values of the vegetation are extracted from the image information, so that the growth condition of the vegetation is determined, thereby improving the efficiency and the accuracy of the determining; and whether the vegetation grows healthily is identified in time, so as to be able to take corresponding treatment when the vegetation is unhealthy.

Figure 7:
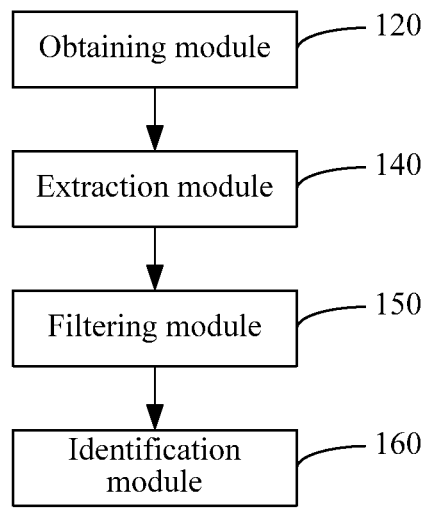
FIG. 7 is a structural diagram of a system for identifying a vegetation health state of an autonomous moving device according to another embodiment.

As shown in FIG. 7, a system for identifying a vegetation health state according to another embodiment further includes a filtering module 150. This embodiment may be combined with the foregoing embodiments to form an entire solution.

The filtering module 150 is configured to filter the RGB values of the vegetation, so as to filter and eliminate RGB values that are not of the color of the vegetation from the RGB values of the vegetation. When the near-infrared camera obtains the image information of the vegetation, the obtained image information is various and may include an image of the sky, an obstacle, other images, and like. Therefore, the RGB values extracted from the image information are also different. However, directly determining and identifying the RGB values that do not belong to the vegetation in step S160 require a relatively long operation time and have relatively high requirements on the processing performance of the controller. Therefore, the RGB values of the vegetation may be filtered to eliminate RGB values that are not of a plant. The RGB values of the vegetation may be compared with preset intervals, to determine whether the RGB values of the vegetation are in the preset intervals. If not, it indicates that the RGB values that are not of a plant may be directly eliminated. The preset intervals need to include RGB values when the vegetation is in a healthy state and an unhealthy state, so as to ensure that data is not mistakenly deleted, thereby keeping integrity of the data.

Figure 8:
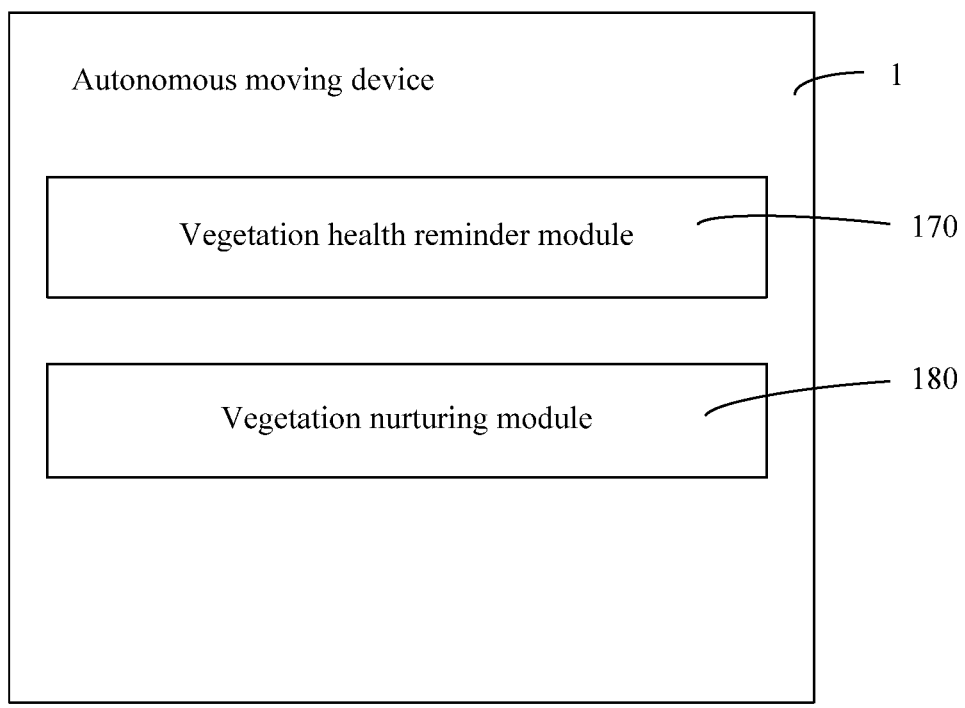
FIG. 8 is a block diagram of an autonomous moving device according to another embodiment.

As shown in FIG. 8, an autonomous moving device according to another embodiment further includes a vegetation health reminder module 170. The vegetation health reminder module 170 sends the information about whether the vegetation is healthy to the user. Specifically, the information about whether the vegetation is healthy includes a region in which the vegetation is located and a vegetation health level and/or vegetation disease type of the region. This embodiment may be combined with the foregoing embodiments to form an entire solution.

In an implementation solution of this embodiment, the vegetation health reminder module 170 includes a communication module. The communication module communicates with a personal intelligent device of the user, to send the information about whether the vegetation is healthy to the personal intelligent device of the user, such as a smartphone, a smart tablet computer, a smart watch, or a personal computer.

In an implementation solution, the information about whether the vegetation is healthy is sent to a personal smart device hold by the user in the form of graphics. The graphical information may be in the form of a garden or a lawn of the user, and a vegetation health level and/or vegetation disease type of each region is indicated thereon in the forms of colors, text, and icons. For example, green, yellow, and red are respectively used to indicate that the health state of the vegetation is good, intermediate, and bad; text or icons are used to indicate that the vegetation in the corresponding region lacks water, lacks fertilizers, needs to be scarified, has pests and diseases, and the like; and values are used to indicate values of various health indicators of the plant. Certainly, other presentation forms are also feasible.

In another implementation solution of this embodiment, the information may be sent, in the form of a health report of the garden, to a smart device of the user in proper manners such as an email or a short message. The health report of the garden shows the health condition of the garden according to categories and regions, for example, an overall health state of the vegetation in each region, a pest and disease condition, water content, nutrient content, or microelement content.

In another implementation solution of this embodiment, the vegetation health reminder module 170 includes a health indication device located on a host. The health indication device presents the information about whether the vegetation is healthy on the host of the autonomous moving device. For example, the health indication device may be a display screen or a sound transmitter. Specific content and the presentation form of the information are similar to those in the foregoing implementation solutions, and details are not described herein again.

The health reminder module further sends vegetation nurturing advice information to the user. Specifically, the vegetation nurturing advice information includes advising at least one of fertilizing, watering, scarification, weeding, and pesticide spraying. Similarly, the vegetation nurturing advice information may also be sent to a personal device of the user in the form of graphics or a report, for example, reminding, in the form of a combination of one or more of a map, a color, text, and an icon, the user that actions such as watering and fertilizing need to be performed on a particular region, and details are not described herein again.

In an optional embodiment, the health reminder module can send only one of the information about whether the vegetation is healthy and the vegetation nurturing advice information.

Referring to FIG. 8 again, a method for identifying a vegetation health state of an autonomous moving device 1 according to another embodiment further includes a vegetation nurturing module 180. The vegetation nurturing module 180 performs a vegetation nurturing action on a region in which the vegetation is unhealthy. Specifically, the vegetation nurturing action includes at least one of fertilizing, watering, scarification, weeding, and pesticide spraying. Correspondingly, the vegetation nurturing module includes at least one of a fertilization module, a watering module, a scarification module, a weeding module, and a pesticide spraying module. This embodiment may be combined with the foregoing embodiments to form an entire solution.

The autonomous moving device 1 correspondingly performs one or more nurturing actions according to specific detected health problems of the vegetation. For example, the autonomous moving device 1 performs an action of watering when it is detected that the vegetation lacks water; the autonomous moving device performs an action of fertilizing, scarification, or weeding when it is detected that the vegetation lacks nutrients; and the autonomous moving device performs an action of pesticide spraying when it is detected that the vegetation has pests and diseases.

One or more of the vegetation nurturing module 180 may be accessories that can be alternatively mounted on the autonomous moving device. When detecting that a particular nurturing action needs to be performed, if no correspondingly particular accessory is mounted on a machine body, the autonomous moving device automatically picks up the particular accessory to perform a nurturing action, or sends reminder information to remind the user to mount the particular nurturing accessory.

A positioning device is mounted on the autonomous moving device 1, so as to associate regional geographic location information and health state information of the vegetation to serve as the foregoing various information and serve as bases for performing various actions. The positioning device may be a GPS device (specifically as a DGPS device), a UWB high-precision positioning device, an image location identification device, and the like.

The technical features of the foregoing embodiments may be freely combined. For a brief description, not all possible combinations of the technical features in the foregoing embodiments are described. However, the combinations of these technical features should be considered to fall within the scope of this specification as long as the combinations are not contradictory.

The foregoing embodiments only describe several implementations of the present invention, and their descriptions are specific and detailed, but cannot therefore be understood as a limitation to the patent scope of the present invention. It should be noted that a person of ordinary skill in the art may further make variations and improvements without departing from the conception of the present invention, and these all fall within the protection scope of the present invention. Therefore, the patent protection scope of the present invention should be subject to the appended claims.

What is claimed is:

1. An autonomous moving device, comprising a camera and a camera heating device, wherein the camera heating device comprises a heating module, and the heating module is configured to heat a lens of the camera to remove water mist on the lens.

2. The autonomous moving device according to claim 1, wherein the camera heating device further comprises a transparent cover disposed outside the camera, and the heating module is mounted inside the transparent cover, and is located at a side portion of the camera and is adjacent to the camera.

3. The autonomous moving device according to claim 2, wherein the transparent cover is a glass transparent cover or a plastic transparent cover.

4. The autonomous moving device according to claim 2, wherein the heating module comprises a resistance wire, and the resistance wire is connected to a battery in the autonomous moving device.

5. The autonomous moving device according to claim 4, wherein a heat-conducting insulator is disposed outside the resistance wire.

6. The autonomous moving device according to claim 4, wherein a thermal pad is disposed on the lens of the camera, and the thermal pad is connected to the resistance wire.

7. The autonomous moving device according to claim 4, wherein the resistance wire is a continuously bent resistance wire.

8. The autonomous moving device according to claim 7, wherein the continuously bent resistance wire is a resistance wire bent transversely and vertically.

9. The autonomous moving device according to claim 1, wherein the heating module is located on or inside the camera.

10. The autonomous moving device according to claim 1, further comprising a wiper, wherein the wiper controllably erases the water mist on the lens.

11. The autonomous moving device according to claim 1, further comprising a controller, wherein the controller controls the heating module to heat or stop heating.

12. The autonomous moving device according to claim 11, further comprising a sensor that detects information about an environment nearby the camera, wherein the sensor sends the detected environment information to the controller, and the controller controls, according to whether the environment information meets a preset condition, the heating module to heat or stop heating.

13. The autonomous moving device according to claim 12, wherein the sensor is at least one of a temperature sensor, a humidity sensor, and a rain sensor.

14. The autonomous moving device according to claim 11, further comprising a communication module, wherein the communication module receives climate information and sends the climate information to the controller, and the controller controls, according to whether the climate information meets a preset condition, the heating module to heat or stop heating.

15. The autonomous moving device according to claim 11, further comprising a clock module, wherein the clock module records time information and sends the time information to the controller, and the controller controls, according to whether the time information meets a preset condition, the heating module to heat or stop heating.

16. The autonomous moving device according to claim 1, further comprising a system for identifying a vegetation health state, wherein the system for identifying a vegetation health state comprises:
   an obtaining module, configured to obtain image information of vegetation;
   an extraction module, configured to extract color values corresponding to the vegetation from the image information, the color value being RGB values of the vegetation; and
   an identification module, configured to compare the RGB values of the vegetation with color values when the vegetation grows healthily to identify whether the vegetation is healthy.

17. The autonomous moving device according to claim 16, wherein the obtaining module is a near-infrared camera.

18. The autonomous moving device according to claim 16, further comprising a vegetation health reminder module, wherein the vegetation health reminder module sends information about whether the vegetation is healthy and/or vegetation nurturing advice information to a user.

19. The autonomous moving device according to claim 18, wherein the vegetation health reminder module comprises a communication module, the communication module communicates with a personal intelligent device of the user, to send the information about whether the vegetation is healthy and/or the vegetation nurturing advice information to the personal intelligent device of the user.

20. The autonomous moving device according to claim 18, wherein the information about whether the vegetation is healthy comprises a region in which the vegetation is located and a vegetation health level and/or vegetation disease type of the region; and the vegetation nurturing advice information comprises advising at least one of advices on fertilizing, watering, scarification, weeding, and pesticide spraying.

21. The autonomous moving device according to claim 16, further comprising a vegetation nurturing module, wherein the vegetation nurturing module performs a vegetation nurturing action on a region in which the vegetation is unhealthy.

22. The autonomous moving device according to claim 21, wherein the vegetation nurturing module comprises at least one of a fertilization module, a watering module, a scarification module, a weeding module, and a pesticide spraying module.

23. The autonomous moving device according to claim 5, wherein a thermal pad is disposed on the lens of the camera, and the thermal pad is connected to the resistance wire.

* * * * *